US012536376B2

(12) United States Patent
Perot et al.

(10) Patent No.: US 12,536,376 B2
(45) Date of Patent: Jan. 27, 2026

(54) DOCUMENT ENTITY EXTRACTION USING MACHINE-LEARNED MODELS

(71) Applicant: Google LLC, Mountain View, CA (US)

(72) Inventors: Vincent Perot, Brooklyn, NY (US); Florian Luisier, Boston, MA (US); Kai Kang, Seattle, WA (US); Ramya Sree Boppana, Sunnyvale, CA (US); Jiaqi Mu, Sunnyvale, CA (US); Xiaoyu Sun, Sunnyvale, CA (US); Carl Elie Saroufim, San Francisco, CA (US); Guolong Su, Houston, TX (US); Hao Zhang, Jersey City, NJ (US); Nikolay Alexeevich Glushnev, Woondinville, WA (US); Nan Hua, Palo Alto, CA (US); Yun-Hsuan Sung, San Francisco, CA (US); Michael Yiupun Kwong, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 218 days.

(21) Appl. No.: 18/453,236

(22) Filed: Aug. 21, 2023

(65) Prior Publication Data
US 2025/0068847 A1 Feb. 27, 2025

(51) Int. Cl.
*G06F 40/295* (2020.01)
*G06V 30/19* (2022.01)

(52) U.S. Cl.
CPC ...... *G06F 40/295* (2020.01); *G06V 30/19147* (2022.01)

(58) Field of Classification Search
CPC .................. G06F 40/295; G06V 30/19147
See application file for complete search history.

(56) References Cited

U.S. PATENT DOCUMENTS

| 8,209,265 | B1* | 6/2012 | Agnew | ............... G06Q 30/04 705/311 |
| 9,923,931 | B1* | 3/2018 | Wagster | ............... H04L 43/10 |
| 10,095,677 | B1* | 10/2018 | Manohar | ............. G06V 30/412 |

(Continued)

OTHER PUBLICATIONS

International Search Report and Written Opinion for Application No. PCT/US2024/043042, mailed Oct. 30, 2024, 10 pages.

*Primary Examiner* — Kevin Ky
(74) *Attorney, Agent, or Firm* — DORITY & MANNING P.A.

(57) ABSTRACT

Systems and methods for performing document entity extraction are described herein. The method can include receiving an inference document and a target schema. The method can also include generating one or more document inputs from the inference document and one or more schema inputs from the target schema. The method can further include, for each combination of the document input and schema input, obtaining one or more extraction inputs by generating a respective extraction input based on the combination, providing the respective extraction input to the machine-learned model, and receiving a respective output of the machine-learned model based on the respective extraction. The method can also include validating the extracted entity data based on reference spatial locations and inference spatial locations and outputting the validated extracted entity data.

20 Claims, 8 Drawing Sheets

(56) References Cited

U.S. PATENT DOCUMENTS

| | | | |
|---|---|---|---|
| 2007/0198951 A1* | 8/2007 | Frank | G06F 16/9537 |
| | | | 707/E17.026 |
| 2008/0010605 A1* | 1/2008 | Frank | G06F 16/29 |
| | | | 715/765 |
| 2008/0033944 A1* | 2/2008 | Frank | G06F 16/9537 |
| 2008/0052638 A1* | 2/2008 | Frank | G06V 30/422 |
| | | | 715/808 |
| 2008/0065685 A1* | 3/2008 | Frank | G06F 16/29 |
| | | | 707/999.102 |
| 2008/0141117 A1* | 6/2008 | King | G06F 16/93 |
| | | | 714/48 |
| 2009/0112812 A1* | 4/2009 | Ellis | G06F 16/38 |
| 2017/0140219 A1* | 5/2017 | King | G06F 40/166 |
| 2018/0096203 A1* | 4/2018 | King | G06F 40/109 |
| 2019/0279101 A1* | 9/2019 | Habti | G06N 20/00 |
| 2019/0286896 A1* | 9/2019 | Wyle | G06V 30/416 |
| 2020/0097717 A1* | 3/2020 | Young | G06V 30/416 |
| 2023/0049167 A1* | 2/2023 | Wilson | G06V 30/19107 |

* cited by examiner

DOCUMENT ENTITY EXTRACTION USING MACHINE-LEARNED MODELS

FIELD

The present disclosure relates generally to document entity extraction. More particularly, the present disclosure relates to extracting data entities from documents into a target data schema.

BACKGROUND

Documents can contain large amounts of data. Data obtained from these documents may not be structured in a desired format. Certain portions of the data might be associated with semantically meaningful categories or labels, but such association may not be explicit in the raw data. Techniques that map data values to one or more desired labels are often described as performing document entity extraction.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for performing document entity extraction. The method can include receiving, by a computing system comprising a processor, an inference document and a target schema, wherein the inference document comprises document data and one or more reference location tags respectively indicating one or more reference spatial locations of the document data within a rendering of the inference document. The method can also include generating, by the computing system and based on an input dimension of a machine-learned model, one or more document inputs from the inference document and one or more schema inputs from the target schema. The method can further include, for each respective combination of the one or more document inputs and the one or more schema inputs, obtaining one or more extraction inputs by generating, by the computing system, a respective extraction input based on the respective combination, providing, by the computing system, the respective extraction input to the machine-learned model, and receiving, by the computing system, a respective output of the machine-learned model based on the respective extraction input, wherein the respective output comprises entity data extracted according to the target schema and one or more inference location tags corresponding to one or more inference spatial locations of the entity data within the rendering of the inference document. The method can also include validating, by the computing system, the extracted entity data based on the reference spatial locations and the inference spatial locations and outputting, by the computing system, the validated extracted entity data.

Another example aspect of the present disclosure is directed to a computing system for performing document entity extraction. The computing system can include one or more processors and a non-transitory, computer-readable medium comprising instructions that, when executed by the one or more processors, cause the one or more processors to perform operations. The operations can include receiving an inference document and a target schema, wherein the inference document comprises document data and one or more reference location tags respectively indicating one or more reference spatial locations of the document data within a rendering of the inference document. The operations can also include generating, based on an input dimension of a machine-learned model, one or more document inputs from the inference document and one or more schema inputs from the target schema. The operations can further include, for each respective combination of the one or more document inputs and the one or more schema inputs, obtaining one or more extraction inputs by generating a respective extraction input based on the respective combination, providing the respective extraction input to the machine-learned model, and receiving a respective output of the machine-learned model based on the respective extraction input, wherein the respective output comprises entity data extracted according to the target schema and one or more inference location tags corresponding to one or more inference spatial locations of the entity data within the rendering of the inference document. The operations can also include validating the extracted entity data based on the reference spatial locations and the inference spatial locations and outputting the validated extracted entity data.

Another example aspect of the present disclosure is directed to a non-transitory, computer-readable medium comprising instructions that, when executed by one or more processors, cause the one or more processors to perform operations. The operations can include receiving an inference document and a target schema, wherein the inference document comprises document data and one or more reference location tags respectively indicating one or more reference spatial locations of the document data within a rendering of the inference document. The operations can also include generating, based on an input dimension of a machine-learned model, one or more document inputs from the inference document and one or more schema inputs from the target schema. The operations can further include, for each respective combination of the one or more document inputs and the one or more schema inputs, obtaining one or more extraction inputs by generating a respective extraction input based on the respective combination, providing the respective extraction input to the machine-learned model, and receiving a respective output of the machine-learned model based on the respective extraction input, wherein the respective output comprises entity data extracted according to the target schema and one or more inference location tags corresponding to one or more inference spatial locations of the entity data within the rendering of the inference document. The operations can also include validating the extracted entity data based on the reference spatial locations and the inference spatial locations and outputting the validated extracted entity data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
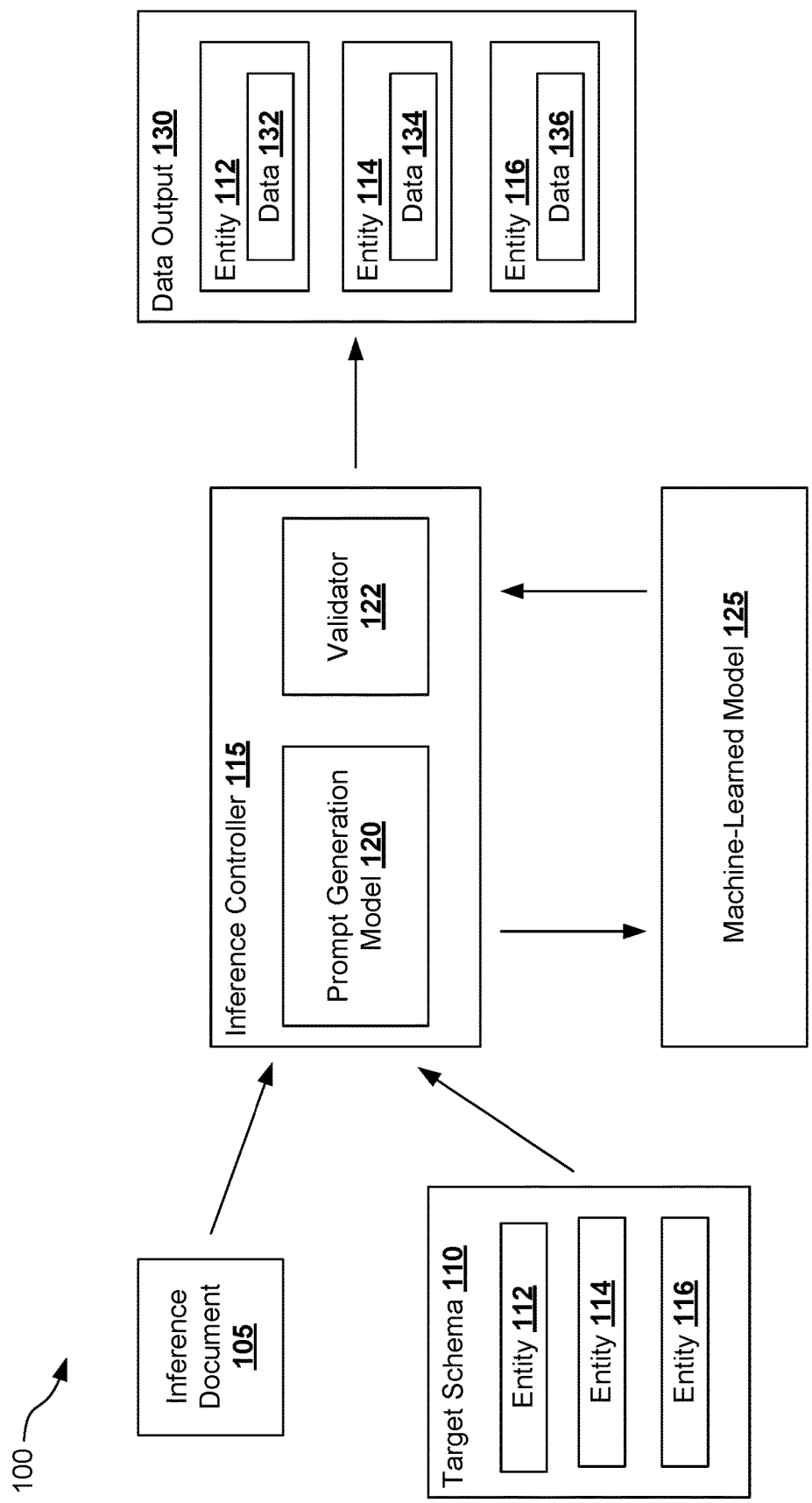
FIG. 1 depicts a block diagram of an example document entity extraction system according to example embodiments of the present disclosure.

Reference numerals that are repeated across plural figures are intended to identify the same features in various implementations.

DETAILED DESCRIPTION

Overview

Generally, the present disclosure relates to document entity extraction. More particularly, the present disclosure relates to extracting data entities from documents into a target data schema using machine-learned models. In example implementations, machine-learned models can output portions of the document that are associated with one or more categories in the schema. Advantageously, example techniques of the present disclosure can ground the outputs of the machine-learned models in the rendering of the document itself to facilitate error checking and validation. This can help mitigate or eliminate model output errors, such as model hallucinations (e.g., the model outputting data that is not in the document).

Existing techniques for document entity extraction often rely on hand-crafted parsers for particular document types (e.g., that look in a particular portion of a page for a particular value). These approaches can be extremely costly to instantiate and lack flexibility to easily parse new document types.

Some existing techniques do use machine-learned models to perform entity extraction. But these models are generally specifically constructed and trained for particular tasks in order to decrease or mitigate erroneous output. Although this constrained use of machine-learned models can offer some improvement of purely manual parsing algorithms, such prior techniques remain costly to instantiate and lack significant flexibility to easily parse new document types out of the domain of a training set.

In contrast, example implementations of the present disclosure provide a processing flow that builds in robustness to differences in the underlying machine-learned models. For instance, example implementations can be agnostic to or otherwise independent from the machine-learned model used to generate the entity extraction data. For instance, example implementations can use a generalized machine-learned language processing model (e.g., a model hosted on a server that is made available to multiple different client processes for performing multiple different tasks). Advantageously, this flexibility can allow for the input of arbitrary documents and schemas, in contrast to prior techniques that require specific document-type parsers (e.g., invoice parsers, paystub parsers, tax document parsers, etc.) for parsing data entities out of documents.

For instance, an example document entity extraction system according to the present disclosure can receive an inference document and a target schema for extracting entities from the inference document. The example document entity extraction system can generate inputs for a downstream machine-learned model (e.g., prompts) based on the inference document and the target schema. Depending on one or more length parameters, the inference document and the target schema can be passed in whole to the machine-learned model or subdivided into multiple document inputs and schema inputs representing sub-portions of the inference document and the target schema. Each unique combination of (document input, schema input) can then be passed to the machine-learned model. The machine-learned model can perform entity extraction from the document input to populate the schema input. The results from processing can be collected and merged to obtain a populated target schema. This can be repeated a number of times to evaluate a consistency metric across the iterations. Based on the consistency metric (e.g., a vote), preferred outputs can be selected. For instance, the most common data value for a particular label can be selected for the final output value.

The example document entity extraction system can output values that are grounded to a portion of the document. For example, the entity extraction system can process document data from a rendering of a document (e.g., an image or other recording, such as an audio or audiovisual recording). The document data can be registered by location within the rendered document (e.g., using coordinates, pixel values, timestamp values, etc.).

The example document entity extraction system can utilize document data locations to verify and validate data extracted by the language processing model. For example, the input inference document can include reference spatial locations associated with the location of document data in the inference document, such as coordinates for vertices of a bounding box containing the document data. For a particular output value, the language processing model can output extracted data from the inference document and output inference spatial locations for the extracted data.

The example document entity extraction system can use the inference spatial locations to identify reference spatial locations in the input inference document where data was extracted from. The document entity extraction system can compare the extracted data and document data at the reference spatial location to determine if the extracted data was present in the original inference document. If the data is present at the reference spatial location, the extracted data can be validated. If the data is not present at the reference spatial location, the extracted data can be ignored.

The example document entity extraction system can also perform data validation using sampling and voting processes. The document entity extraction system can provide generated prompts to the language processing model a number of times to obtain a plurality of outputs from the language processing model for each prompt. The document entity extraction system can perform top-p or top-k sampling on the plurality of outputs to determine any variability in returned data values from the plurality of outputs. The document entity extraction system can then perform various voting schemes, such as majority voting, to determine a final extracted value based on the sampled plurality of outputs.

Example implementations according to the present disclosure can provide a number of technical effects and benefits. For instance, example document entity extraction systems of the present disclosure can enable more accurate data entity extraction by utilizing grounding (e.g., the use of extracted inference spatial locations to validate extracted data against the original inference document) and confidence scores/voting systems to ensure that extracted data entities are correct. Grounding enables the document entity extraction system to validate extracted entities by confirming the existence of data matching those entities at locations indicated by the line tag or coordinates in the original inference document, thus ensuring that the extracted data is physically present in the original document.

Computation of confidence scores can be performed in conjunction with grounding to validate the data. Because of the number of samples for each prompt, the resulting values from each sample can be synthesized into a single, more certain value. This more certain value more accurately reflects what is most likely present in the original document. Thus, the document entity extraction system can further validate that the extracted data entities have proper values by selecting the most common returned answer, the most confident answer, and/or removing outlier outputs from the language processing model.

The use of grounding and confidence scores for data validation can improve the reliability of the document entity extraction system by ensuring that, regardless of the type of document input, extracted data values can be validated against the original inference document and can account for possible language processing model hallucination by utilizing a plurality of outputs and sampling and voting processes to ensure that the large language model is outputting a real and accurate extracted data value. Such data validation can improve the functioning of the computing system by preventing the computing system from injecting error into data processing tasks. Such error correction and error prevention techniques can improve the field of data processing as a whole by facilitating increased reliability, decreased downtime, etc. by solving problems relating to machine interpretation of unstructured inputs.

The use of data validation also can also increase data security in the document entity extraction system because the data is validated with an engineering data comparison, rendering the document entity extraction system more robust against adversarial attack, because any outputs from the machine-learned model(s) responsive to malicious adversarial inputs can ultimately be screened by and validated against the data in the document itself. For instance, although a document might contain a text sequence configured to induce a machine-learned model to reveal proprietary or other confidential information, the example entity extraction system of the present disclosure can validate any output of the machine-learned model against data in the document, such that any proprietary or other confidential information that is not already in the document can be screened from the output.

A technical effect of example implementations of the present disclosure is increased energy efficiency in performing operations using machine-learned models, thereby improving the functioning of computers implementing such models. For instance, by providing a model-agnostic document entity extraction system, example implementations can leverage existing models and existing model infrastructure in lieu of requiring new models to be created and trained and new serving infrastructure to be hosted solely to perform a single type of document entity extraction task. In this manner, for instance, by leveraging more general model architectures and infrastructures, training compute costs can be reduced. By decreasing a compute requirement for implementing machine-learned document entity extraction, an amount of energy usage can be decreased (e.g., on a unit basis, such as an amount of energy amortized over the documents processed, or on a gross energy expenditure basis, such as a total amount consumed).

In this manner, for instance, the improved energy efficiency of example implementations of the present disclosure can reduce an amount of pollution or other waste associated with implementing machine-learned models and systems, thereby advancing the field of machine-learning and artificial intelligence as a whole. The amount of pollution can be reduced in toto (e.g., an absolute magnitude thereof) or on a normalized basis (e.g., energy per task, per model size, etc.). For example, an amount of $CO_2$ released (e.g., by a power source) in association with training and execution of machine-learned models can be reduced by implementing more energy-efficient training or inference operations. An amount of heat pollution in an environment (e.g., by the processors/storage locations) can be reduced by implementing more energy-efficient training or inference operations.

With reference now to the Figures, example embodiments of the present disclosure will be discussed in further detail.

Example Model Arrangements

FIG. 1 depicts a block diagram of an example document entity extraction system 100 according to example embodiments of the present disclosure. The document entity extraction system can receive an inference document 105 and a target schema 110. The inference document 105 and the target schema 110 can be provided to a prompt generation model 120 of an inference controller 115. The prompt generation model 120 can use the inference document 105 and target schema 110 to generate input(s) for machine-learned model 125. The inference controller 115 can provide the input(s) to the machine-learned model 125 and can receive corresponding output(s) from the machine-learned model 125 that contain predicted entity extraction values based on target schema 110. Validator 122 can process the output(s) of the machine-learned model 125 to validate and assemble data output 130.

The document entity extraction system 100 can receive inputs that include the inference document 105 and the target schema 110. The inference document 105 can be a representation of a document. A document can include any variety of data source. A document can include information physically printed or otherwise marked upon paper or another substrate. A document can include an electronically rendered collection of information, such as an electronic file or database record that stores information to be displayed or otherwise rendered (e.g., audiovisually, haptically) to communicate the information. Digitally stored documents can encode text data, audio data, image data, etc., and can include PDF files, A representation of a document can be generated from the document using a document preprocessor. For example, a paper document can be scanned to obtain an image representation of the document. The image of the document can be processed with an optical character recognition system (OCR) to obtain a textual representation of the contents of the document. Similarly, an audio document can be parsed with a speech recognition tool to generate a textual representation of the audio document. Video documents can be parsed into images (e.g., frames), text, etc. in a similar manner. Documents which subsist in a desired representation can be obtained directly (e.g., web content existing in plain text, etc.). Documents which are otherwise encoded can be decoded accordingly to obtain a desired representation format.

The inference document 105 can include reference location tags for different portions of the document data. The reference location tags can be obtained in a preprocessing operation that outputs inference document 105. The reference location tags can indicate reference locations of different portions of the document data within a rendering of the inference document 105. For instance, the reference locations can be spatial locations, such as x and y minimum and maximum coordinates within the inference document 105. In some embodiments, these x and y minimum and maximum coordinates can indicate a location of a bounding box containing a portion of the document data associated with the reference location tag. In some embodiments, the reference spatial data can include line numbers within the inference document 105 associated with the portion of document data. In an example, the reference locations can be temporal locations, such as timestamps within a time-dimensioned document (e.g., audio recording, video recording, etc.).

In some embodiments, the inference document 105 has undergone optical character recognition ("OCR"). The OCR process can result in the generation of the document data and reference location tags for different portions of the document data. In other embodiments, the inference document 105 can simply be an image representation of an electronic document and no OCR is needed; instead, the image representation itself can be processed. For example, prompt generation model 120 can generate multimodal prompts that can instruct machine-learned model 125 to populate a portion of target schema 110 based on an input image. In some embodiments, the inference document 105 can be in plain text already, and not require any further processing.

Example content from an inference document is provided below:

```
Fictional Company LLC 07 | 03 | 23 | 04
INVOICE 75 | 03 | 93 | 06
Due Date: 67 | 17 | 75 | 18
Nov 3, 2019 83 | 17 | 92 | 18
Balance Due: 63 | 20 | 74 | 21
$26,211.90 83 | 20 | 92 | 21
```

In this example of content from an inference document, textual content obtained from the original document is provided at the beginning of the line. Reference location tags are appended to the line in the following format: "{x_min}|{y_min}|{x_max}|{y_max}". It is to be understood that this example is provided for the sake of illustration only. Other formats can be used. For instance, reference location tags can be or include line numbers. Reference location tags can be or include locations in other coordinate systems. Reference location tags can include other values, such as height and width values for bounding boxes.

The target schema 110 can include a definition of a schema for extracted data, such as defining the structure of data entities (e.g., data entities 112, 114, 116) to be extracted from the inference document 105. The target schema 110 can describe the structure of the data entities to be extracted in a formal language, can describe various sub-entities for each data entity, can describe types of data to be extracted, can describe example values of data to be extracted, and the like. Data entities with sub-entities can be nested entities. Nested entities include a top-level data entity and one or more sub-entities, which in turn can have types of data to be extracted, can describe example values of data to be extracted, and the like.

Nesting can include multiple layers. For instance, a nested structure can include a top-level entity, zero, one, or more intermediate entities, and one or more leaf entities. In some embodiments, there can be multiple instances of a single top-level entity (e.g., multiple line items in an invoice). An example arrangement of top-level entities, intermediate entities, and leaf entities can include the following:

```
{
    "top level entity": [
        "leaf entity": "",
        "intermediate entity 1" : {
            "leaf entity": "",
        },
        "intermediate entity 2" : {
            "leaf entity": "",
        },
    ],
}
```

In a sample embodiment, the target schema 110 can include data entities such as "Company Name," "Invoice ID Number," "Line Item" with nested entities "amount" and "description," "Contact Information," "Filing Status," "Account Type," and other suitable entities, with associated data types for the data entities, such as strings. For instance, an example target schema is illustrated below in JSON format:

```
{
    "Company Name": "",
    "Invoice ID Number": "",
    "Line Item":[
        {
            "amount": "",
            "description": "",
        }
    ]
    "Contact Information": "",
    "Filing Status": "",
    "Account Type": "",
}
```

The inference controller 115 can receive inference document 105 and target schema 110. The inference controller 115 can include a prompt generation model 120. The prompt generation model 120 can take the inference document 105 and the target schema 110 as input and, using the inference document 105 and the target schema 110, generate a prompt for completion by the machine-learned model 125.

The prompt generation model 120 can include one or more machine-learned models. The prompt generation model 120 can include one or more data processing components that can receive and combine inputs. The prompt generation model 120 can receive an inference document 105 and a target schema 110 can combine data from each to generate an input for the machine-learned model 125.

The prompt generation model 120 can add additional content to the prompt. For instance, the prompt generation model 120 can add instructions for the machine-learned model 125 to execute based on the provided data. For instance, the prompt generation model 120 can insert description of the entity extraction task, description of the provided document(s), description of the schema, instructions for how to populate the schema, etc.

Extraction instructions can provide the machine-learned model 125 with directions for extracting data entities from the document portions and with rules for matching the data entities to the schema portions. A sample extraction instruction can be "the extraction must respect the schema," indicating that any extracted data entity must be extracted to match the target schema 110 and not to create a new data entity within the target schema 110. More complex extraction instructions can provide valid value formats for extraction (e.g., "valid string value format "FORMAT_FOR_STRING"), invalid value formats, indications of values that will be present (e.g., "line tags appear at the end of each line."), and the like.

This additional content can be generated by a machine-learned model (e.g., a model configured to generate instructions for entity extraction) or retrieved from a stored file.

For example, using the example inference document and target schema shown above, in one example the prompt generator 120 can output the following prompt:

```
For the keys in SCHEMA, extract values containing the
corresponding text and tags from DOCUMENT and provide the
key-value pairs in OUTPUT in JSON format.
SCHEMA:
{
"Company Name": "",
"Invoice ID Number": "",
"Line Item":[
  {
    "amount": "",
    "description": "",
  }
]
"Due Date": "",
"Amount": "",
"Account Type": "",
}
DOCUMENT:
Fictional Company LLC 07 | 03 | 23 | 04
INVOICE 75 | 03 | 93 | 06
Due Date: 67 | 17 | 75 | 18
Nov 3, 2019 83 | 17 | 92 | 18
Balance Due: 63 | 20 | 74 | 21
$26,211.90 83 | 20 | 92 | 21
$200.00 15 | 25 | 20 | 26
Item of work 30 | 25 | 45 | 26
OUTPUT:
{
```

Machine-learned model 125 can receive and process the generated prompt. Machine-learned model 125 can be, for example, a model configured for processing natural language. Machine-learned model 125 can be a model configured for processing multimodal data, such as data in image and text format. Machine-learned model 125 can be or include various types of models, including deep neural networks, transformer models, etc. For instance, an example model can be referred to as a "large language model" (LLM).

The machine-learned model 125 can receive the generated prompt and generate an output based on the inference document 105 and the target schema 110. In some examples, the output can be a completion of the prompt. The output can be an answer to or otherwise a response to the prompt. For example, the machine-learned model 125 can receive a generated prompt asking the machine-learned model 125 to identify values in the inference document 105 related to invoice amounts, invoice identification numbers, or other data entities. In some examples, the machine-learned model 125 can encode the prompt into a context vector and then utilize the context vector to identify portions of the inference document 105 associated with the data entities.

The output of the machine-learned model 125 can be one or more data values for data entities defined in the schema. For example, based on an input of the inference document 105 and the target schema 110 requiring an invoice amount and invoice identification number, the machine-learned model 125 can output an invoice amount of "$5000" and an invoice identification number of "0123456" from the inference document 105.

An example completion for a prompt can be as follows (carrying forward the examples from above:

```
{
"Company Name": "Fictional Company LLC 07 | 03 | 23 | 04",
"Invoice ID Number": "null",
"Due Date": "Nov 3, 2019 83 | 17 | 92 | 18",
"Amount": "26,211. 90 83 | 20 | 92 | 21",
"Account Type": "null",
"Line Item":[
{
  "amount": "200.00",
  "description": "Item of work",
  }
]}
```

In some embodiments, the machine-learned model 125 may not be able to find a verbatim data entity in the inference document 105. For example, the target schema 110 can define an "Invoice ID" data entity, but the machine-learned model 125 may only be able to identify an "Invoice Number" in the inference document 105. The machine-learned model 125 can therefore support abstractive extraction, where the verbatim data entity is not present in the document, but the machine-learned model 125 is able to understand, based on the context, that the data entity is, in fact, present, under a similar or related name.

Similarly, a machine-learned model 125 can inferentially obtain computed entity values. For instance, if a requested entity is "Total order price," and the document only contains "unit price" and "unit quantity," machine-learned model 125 can output the product of the unit price value and the unit quantity value as the total order price entity value. The machine-learned model 125 can also output an indication of the component values used in the computation (along with their corresponding location tags) for downstream validation.

The inference controller 115 can receive the output from the machine-learned model 125 and validator 122 can validate the output from the machine-learned model 125. For instance, validator 122 can determine whether the output entity values have an inference location tag. Validator 122 can invalidate values lacking an inference location tag. Validator 122 can determine if an inference location tag for an extracted entity value points to a location in the inference document 105 that contains content matching the extracted entity value. If there is no match, validator 122 can invalidate the value. Validator 122 can validate extracted entity values that agree with the original content from the inference document 105.

For example validator 122 can find the reference spatial location in the original inference document 105 based on the inference spatial location extracted by the large language model 125. In one example, validator 122 can identify the reference spatial location in the original inference document using the inference spatial location, such as using one or more values of coordinates from the inference spatial location to identify the reference spatial location in the original inference document 105.

Validator 122 can perform a normalized string search on the line text at the reference spatial location in the original inference document 105 to determine if the extracted data entity value matches the value at the reference spatial location. If a match is found, validator 122 can obtain a text anchor for the matched value based on the reference spatial location. In some embodiments, the text anchor is obtained by obtaining a start index of the matching value on the line in the inference document 105 and then determining the full text anchor using Equation 1 provided below.

Equation 1 text anchor = [line_start_index + match_start_index, line_start_index + match_start_index + length(entity_value_on_line) + 1].

The generated text anchor can then be associated with the extracted data entity. During confidence scoring (as described below), samples with text anchors can be used to determine a final extracted data entity output. Conversely, samples without a text anchor (e.g., did not match the normalized string search) can be discarded when determining a final extracted data entity output because the extracted values of the data entity cannot be grounded in the original document. For example, large language models can sometimes "hallucinate," or generate false information. The use of text anchors for grounding and data validation enables extracted data values to be compared to the original inference document 205 to ensure that the extracted data values are actually present in the original inference document 205, and not simply "hallucinated" by the large language model 225.

Validator 122 can parse the returned output to determine if it is in a proper output format. For instance, validator 122 can determine if the output is in proper JSON, XML, CSV, or other desired formats. Validator 122 can apply formatting corrections as needed.

Validator 122 can compare the output against target schema 110 to confirm that all entity types are present, that nested entities are respected, that the data values for extracted entities are strings, and the like.

If the output fails validation, validator 122 can initiate remediation. Remediation can include re-processing the entity extraction task. For instance, remediation can include re-processing the task with different instructions that highlight or caution against that type of error that cause the initial output to fail validation. Remediation can include reprocessing the document with a modified schema, such as a schema only including entities that were missed in the first pass.

After the extracted data is validated, the inference controller 115 can output data output 130. Data output 130 can contain the extracted entity values corresponding to target schema 110. For instance, data output 130 can include extracted and validated entity data values 132, and 134, and 136 respectively corresponding to entities 112, 114, and 116 from the target schema 110. The data output 130 can then be used by other software applications, such as system controllers, security verification systems, communications systems, customer-relationship management software applications, human resources software applications, database software applications, and other software applications that utilize such data to perform various tasks and functions.

Figure 2:
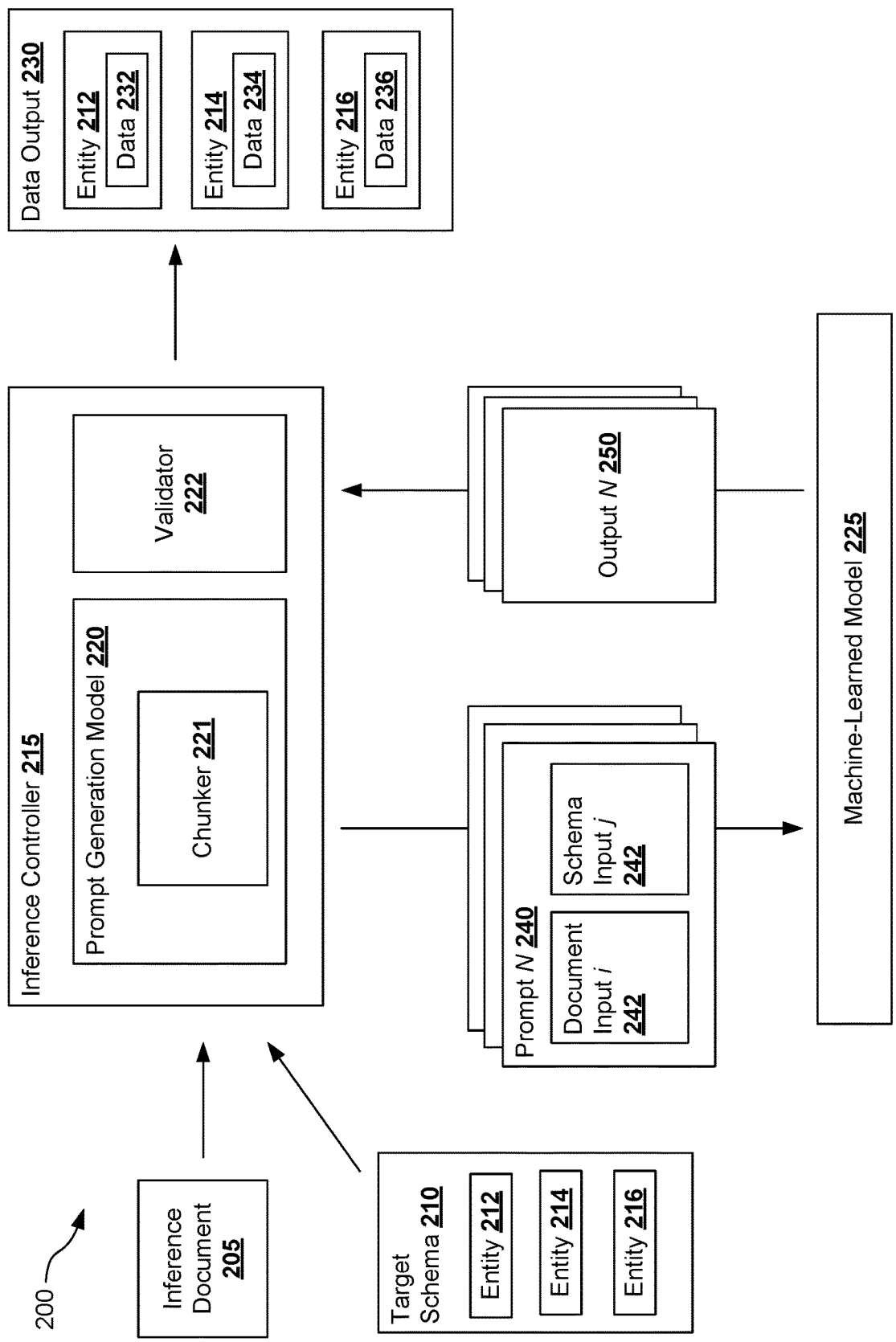
FIG. 2 depicts a block diagram of an example document entity extraction system according to example embodiments of the present disclosure.

FIG. 2 depicts a block diagram of an example document entity extraction system 200 according to example embodiments of the present disclosure. Much like the system described in FIG. 1, the document entity extraction system 200 (which can be the same as or different from system 100) can receive an inference document 205 and a target schema 210. Inference document 205 can be the same as or different from inference document 105. Target schema 210 can be the same as or different from target schema 110. The inference document 205 and the target schema 210 can be provided to a prompt generation model 220 of an inference controller 215. Prompt generation model 220 can be the same as or different from prompt generation model 120. Inference controller 215 can be the same as or different from inference controller 115. The prompt generation model 220 can use the inference document 205 and target schema 210 to generate input(s) for machine-learned model 225. Machine-learned model(s) 225 can be the same as or different from machine-learned model(s) 125. The inference controller 215 can provide the input(s) to the machine-learned model 225 and can receive corresponding output(s) from the machine-learned model 225 that contain predicted entity extraction values based on target schema 110. Validator 222 can process the output(s) of the machine-learned model 225 to validate and assemble data output 230. Validator 222 can be the same as or different from validator 122.

A chunker 221 can process inference document 105 and target schema 210 to perform chunking. Chunking can include subdividing inputs into a number of sub-portions for processing by a machine-learned model. For instance, different machine-learned models can have different input dimensions, and as such have different capacities for processing different amounts of input data. The chunker 221 can subdivide the inference document 205 and the target schema 210 into portions that fit within the respective input capacity of machine-learned model 225. For instance, using chunker 221, prompt generation model 220 can output a prompt N 240 that contains a document input i 242 and schema input j 244, where prompt N 240 is sized to fit within an input dimension of machine-learned model 225.

To allow machine-learned model 225 to process each schema input j 244 in view of each document input i 242, prompt generation model 220 can generate all combinations of document inputs i and schema inputs j in N different prompts. For example, given 3 document inputs and 3 schema inputs, the prompt generator 220 can generate text prompts for each permutation of combinations of document inputs and schema inputs (e.g., (document input 1, schema input 1), (document input 1, schema input 2), (document input 1, schema input 3), (document input 2, schema input 1), and so on).

These N prompts can be fed to machine-learned model 225 to generate N outputs (e.g., with a prompt N 240 corresponding to an output N 250). For instance, data entities 212, 214, and 216 can be located in different schema inputs, and data 232, 234, and 236 can be located in different document inputs, but by processing all the combinations, machine-learned model 225 can be able to successfully populate entity 212 with data 232 responsive to at least one of the N prompts. For the other prompts which lack either entity 212 or data 232, machine-learned model 225 can return a null result. In this manner, for instance, validator 222 can merge the N outputs to obtain a complete data output 230.

For example, as noted above, an example input from prompt generator 220 can include a portion from inference document 205 and a portion from target schema 210. Accordingly, the portions can be selected such that the combination of the portions remains smaller than the input dimension of machine-learned model 225. Additional input capacity can be reserved for instructions added to the portions by prompt generator 220. The amount reserved can be fixed (e.g., 5%, 10%, etc.) or determined dynamically based on a context signal. For instance, complex schemas may be associated with longer instructions, so greater space may be reserved by chunking the inputs into smaller chunks. Similarly, for few-shot implementations, longer documents or more complex schemas may be associated with longer few-shot examples (or more examples), thus consuming more capacity. As such, chunker 221 can identify that capacity is needed for few-shot exemplars and reserve space accordingly by setting a smaller chunk size.

The chunker 221 can subdivide inference document 205 and the target schema 210 to create one or more document inputs and one or more schema inputs. The one or more document inputs can be portions of the inference document 205. The chunker 221 can subdivide the inference document into a number of document inputs by dividing, for example, the inference document 205 into sections, pages, paragraph, sentences, or other sub-units of the document that may or may not align with natural subdivisions of the document itself. For example, the chunker 221 can identify a maximum portion length for the document input(s) and determine a document subdivision that is near to, but does not exceed, the maximum portion length.

Similarly, the target schema 210 can be separated by the chunker 221 into portions for input into a language processing model. In some examples, the chunker 221 can subdivide the target schema 210 by splitting top-level entities in the target schema 210 into independent branches, including any subentities. Each independent branch can be a schema input. In some examples, the chunker 221 can subdivide the target schema 210 into a number of schema inputs by subdividing the target schema 210 based on data types associated with various data entities. For example, the chunker 221 can identify a maximum portion length for the schema input(s) and determine a schema subdivision that is near to, but does not exceed, the maximum portion length.

The chunker 221 can, in some embodiments, create chunks to optimize the performance of the machine-learned model. For example, some machine-learned models can have better performance with shorter inputs or outputs. For instance, some machine-learned models operate on a sequence-to-sequence basis, such that an output sequence is processed based on an input sequence. In some models, small portions of the input (e.g., instructions for performing a task) can have decreased efficacy as the output gets longer and longer (with content being generated in context further removed from the instructions). The chunker 221 can create document inputs and schema inputs of portion length(s) that are configured to improve an output performance. For instance, the portion length(s) can be smaller than necessary, such that the machine-learned model receives shorter inputs than the maximum input dimension. Smaller inputs can provide for faster processing or more accurate processing.

In some embodiments, the chunker 221 can optimize chunk size based on an available compute budget. For instance, large chunks can be processed by machine-learned models with large context windows. But machine-learned models with large context windows can be more expensive to operate. Smaller chunks can be processed by smaller machine-learned models with smaller context windows. But for a document of fixed size, smaller chunks can require more calls to the model to iterate through the full document and schema. Smaller chunks can also result in more combinations that need to be processed, potentially increasing a total input amount across all the iterations.

Accordingly, the chunker 221 can determine a chunk size that optimizes a net compute cost based on the cost of the model 225 to run inference and a count of how many inference runs will be used based on the number of prompts used to process all the combinations of document and schema inputs.

Figure 3:
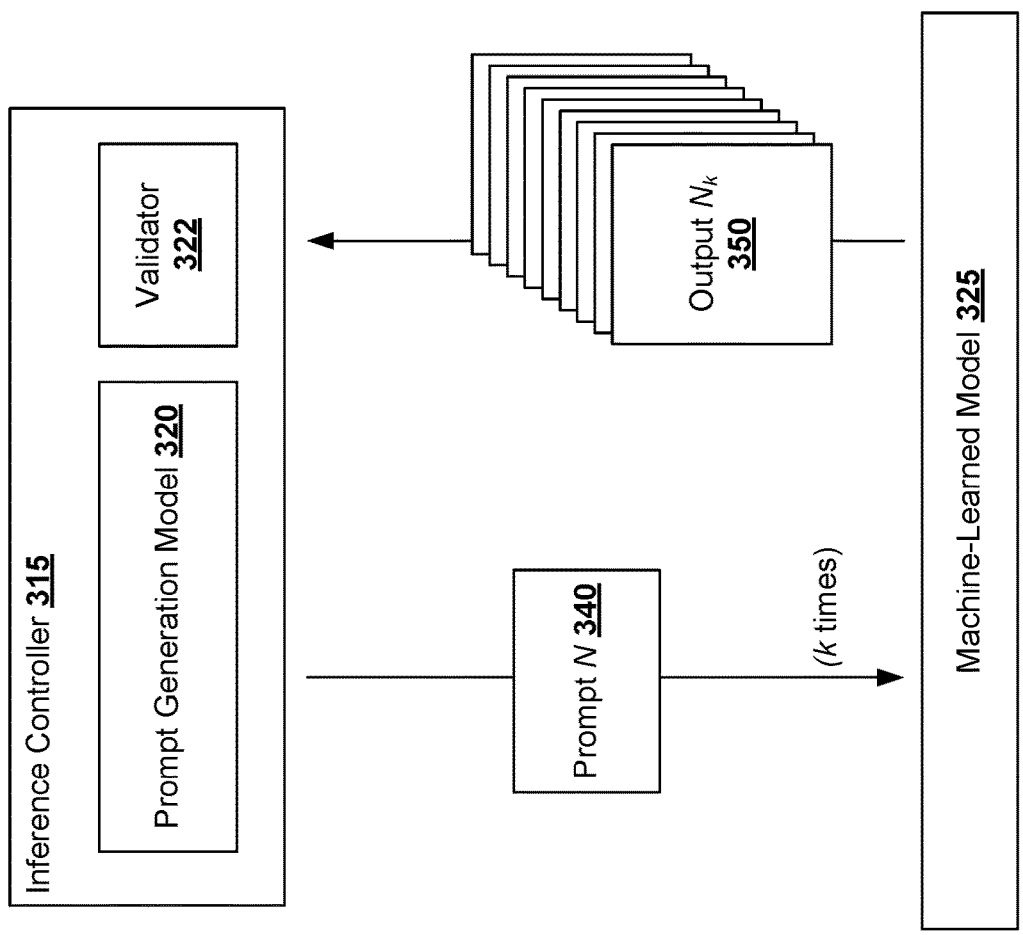
FIG. 3 depicts a block diagram of an example implementation of a document entity extraction system that validates based on a consistency metric according to example embodiments of the present disclosure.

FIG. 3 depicts a block diagram of an example implementation of a document entity extraction system that validates based on a consistency metric. For instance, an inference controller 315 (which can be the same as or different from inference controller 115 or 125) can include a prompt generation model 320 (which can be the same as or different from prompt generation model 120 or 220) and a validator 322 (which can be the same as or different from validator 122 or 222). For each prompt N 340 output by prompt generation model 320, inference controller 315 can cause machine-learned model 325 (which can be the same as or different from machine-learned model 125 or 225) to process the prompt N 340 k times to generate k outputs. Validator 322 can receive each output $N_k$ 350 and compute a consistency metric across the set of received outputs for prompt N 340. The consistency metric can include a vote, such as a majority vote, plurality vote, etc. For example, validator 322 can incorporate top-k and/or top-p sampling.

Because of the randomness introduced by the use of top-p and top-k sampling for each of the number of samples for a generated prompt, the validator 322 can also determine a confidence score. In one embodiment, the confidence score for a particular extracted data value can be determined using Equation 2.

$$\text{Confidence\_score} = \text{number\_samples\_with\_same answer} / \text{total\_number\_of samples} \quad \text{Equation 2}$$

Intuitively, the most confident answer can be the answer from the number of samples that the machine-learned model 325 most often identified to be the data value for the data entity, despite any randomness introduced during sampling. In some embodiments, if the most common answer has multiple elements but the occurrence type for the particular entity is only once in the schema, the validator 325 can select the most frequent-appearing value by text value as the most confident answer.

Based on the generated confidence scores, the validator 325 can identify a final data value for the extracted data entity. It is to be noted that alternative methods for computing confidence scores for data values can be used, such as utilizing weights for each sample received from the machine-learned model 325 (e.g., model-generated confidence scores), using raw logits exposed after decoding, or other voting methods.

In some embodiments, the target schema can include one or more nested entities. Nested entities can include a top-level entity and one or more sub-entities. Nesting can include multiple layers. For instance, a nested structure can include a top-level entity, zero, one, or more intermediate entities, and one or more leaf entities.

Confidence scoring of nested entities can be performed using various techniques based on the nested architecture. In some examples, data extracted for the top-level entity can come from one selected sample, rather than mixing and matching among multiple samples. For example, the confidences for each individual intermediate and leaf entity can be determined and aggregated on a per-sample basis to give a confidence value for the top level entity of that sample, and the resulting values can be selected based on the aggregate confidence for that sample (e.g., all the nested entities from the winning sample). In some embodiments, there can be multiple instances of the same type of top-level entity. Data extracted for each instance can come from one selected sample (e.g., based on the aggregate confidence of entities nested within that instance). Data extracted for all instances can come from one selected sample (e.g., based on the aggregate confidence of all instances). Data extracted for each instance can come from different samples (e.g., based on which sample provides the highest aggregate confidence for the respective instance).

In some examples, data extracted for the top level entity can be mixed and matched across multiple samples. For instance, in some implementations, each individual intermediate and leaf entity value can be selected based on the highest confidence sample for each individual intermediate and leaf entity. The resulting values can include the set of highest-confidence values as determined across all samples.

For each sub-entity in the nested entity, predictions for each sample can be extracted, and then confidence scoring can be performed using the values extracted from each sample. Confidence scoring for each sample can be performed, and in some embodiments, the sample with the highest confidence score can be selected.

Figure 4:
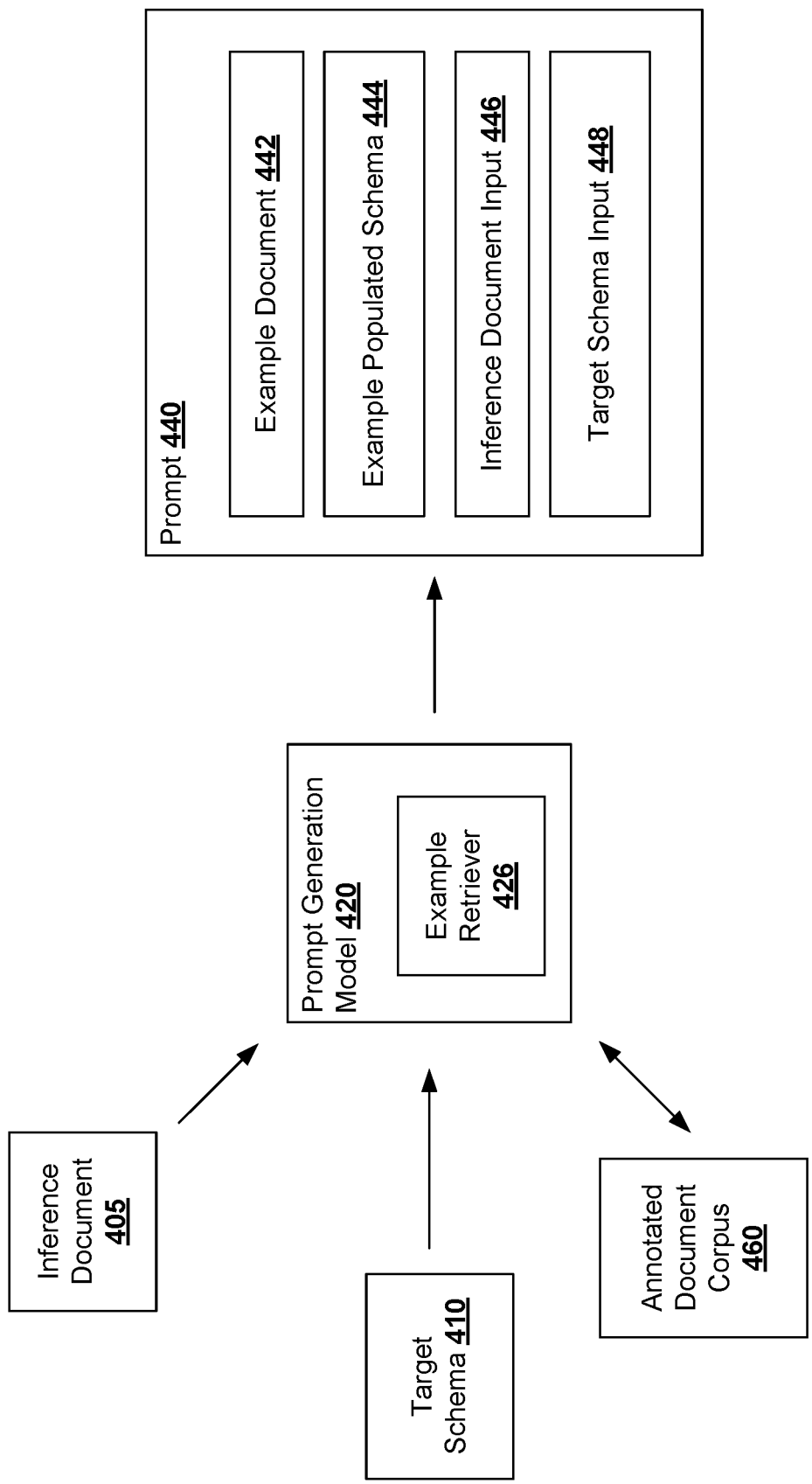
FIG. 4 depicts a block diagram of an example implementation of a prompt generation model that retrieves examples for few-shot prompting according to example embodiments of the present disclosure.

FIG. 4 depicts a block diagram of an example implementation of a prompt generation model that retrieves examples for few-shot prompting. Prompt generation model 420 (which can be the same as or different from prompt generation model 120, 220, or 320) can process an inference document 405 (which can be the same as or different from inference document 105 or 205) and target schema 410 (which can be the same as or different from target schema 110 or 210) to generate a prompt 440 (which can be the same as or different from prompt 240).

To facilitate few-shot prompting, prompt generation model 420 can implement an example retriever 426. Example retriever 426 can process any one or both of inference document 405 and target schema 410 to query an annotated document corpus 460 to retrieve one or more documents and a set of corresponding annotations (e.g., a populated schema) that can operate as examples for how the machine-learned model should populate the target schema 410.

For instance, the example documents can have a template, such as a particular schema or structure. This template can match or be similar to, at least in part, the desired target schema 410. The example retriever 426 can select documents with similar templates to the target schema 410 and include portions of the example document(s) and associated completions of the portions of the example schema for inclusion in a prompt for processing by the machine-learned model. In other embodiments, however, the example retriever can select documents regardless of similarity to the target schema 410.

The selected example documents from the annotated document corpus 460 can optionally be provided to a chunker (e.g., chunker 221) for processing in a similar fashion to the inference document 205 for aligning input dimensions of the prompt with the input dimension of the machine-learned model.

In some embodiments, the selected documents are retrieved at random from the annotated document corpus 230, as long as a schema for the selected documents match or are similar to at least in part the target schema 410. In another embodiment, a nearest neighbor search can be performed using one or more embeddings associated with the annotated documents and the inference document 405 to determine one or more closest matches to the inference document 405 (e.g., documents having the same or substantially similar template). In a further embodiment, a first N search can be performed, which returns the first N documents in the corpus regardless of template. In yet another embodiment, a maximum entity coverage search can be performed. In a maximum entity coverage search, the annotated documents can be ordered by entity coverage (e.g. documents with the maximum number of schema entities being placed first, followed by documents that cover less entities, and then documents with no overlap in schema entities). The first N documents from this ordering can be retrieved.

An example prompt 440 can include at least a portion of an example document 442, at least a portion of an example populated schema 444, an inference document input 446, and a target schema input 448. For example, an example prompt 440 can be as follows:

For the keys in SCHEMA, extract values containing the corresponding text and tags from DOCUMENT and provide the key-value pairs in OUTPUT in JSON format.
SCHEMA:
{
"Company Name": "",
"Invoice ID Number": "",
"Line Item":[
  {
    "amount": "",
    "description": "",
  }
]
"Due Date": "",
"Amount": "",
"Account Type": "",
}
DOCUMENT:
Fictional Company A LLC 07 | 03 | 23 | 04
INVOICE 75 | 03 | 93 | 06
Due Date: 67 | 17 | 75 | 18
Nov 3, 2019 83 | 17 | 92 | 18
Balance Due: 63 | 20 | 74 | 21
$26,211.90 83 | 20 | 92 | 21
$200.00 15 | 25 | 20 | 26
Item of work 30 | 25 | 45 | 26
OUTPUT:
{
  "Company Name": "Fictional Company A LLC 07 | 03 | 23 | 04",
  "Invoice ID Number": "null",
  "Due Date": "Nov 3, 2019 83 | 17 | 92 | 18",
  "Amount": "26,211.90 83 | 20 | 92 | 21",
  "Account Type": "null",
"Line Item":[
  {
    "amount": "200.00",
    "description": "Item of work",
  }
]
}
DOCUMENT:
Fictional Company B LLC 15 | 03 | 62 | 07
INVOICE 06 | 14 | 32 | 16
Due on: 06 | 52 | 18 | 53
Sep 18, 2023 06 | 54 | 29 | 55

-continued

```
Amount Due: 44 | 77 | 60 | 78
$2,000.00 64 | 64 | 72 | 65
OUTPUT:
{
```

Example Methods

Figure 5:
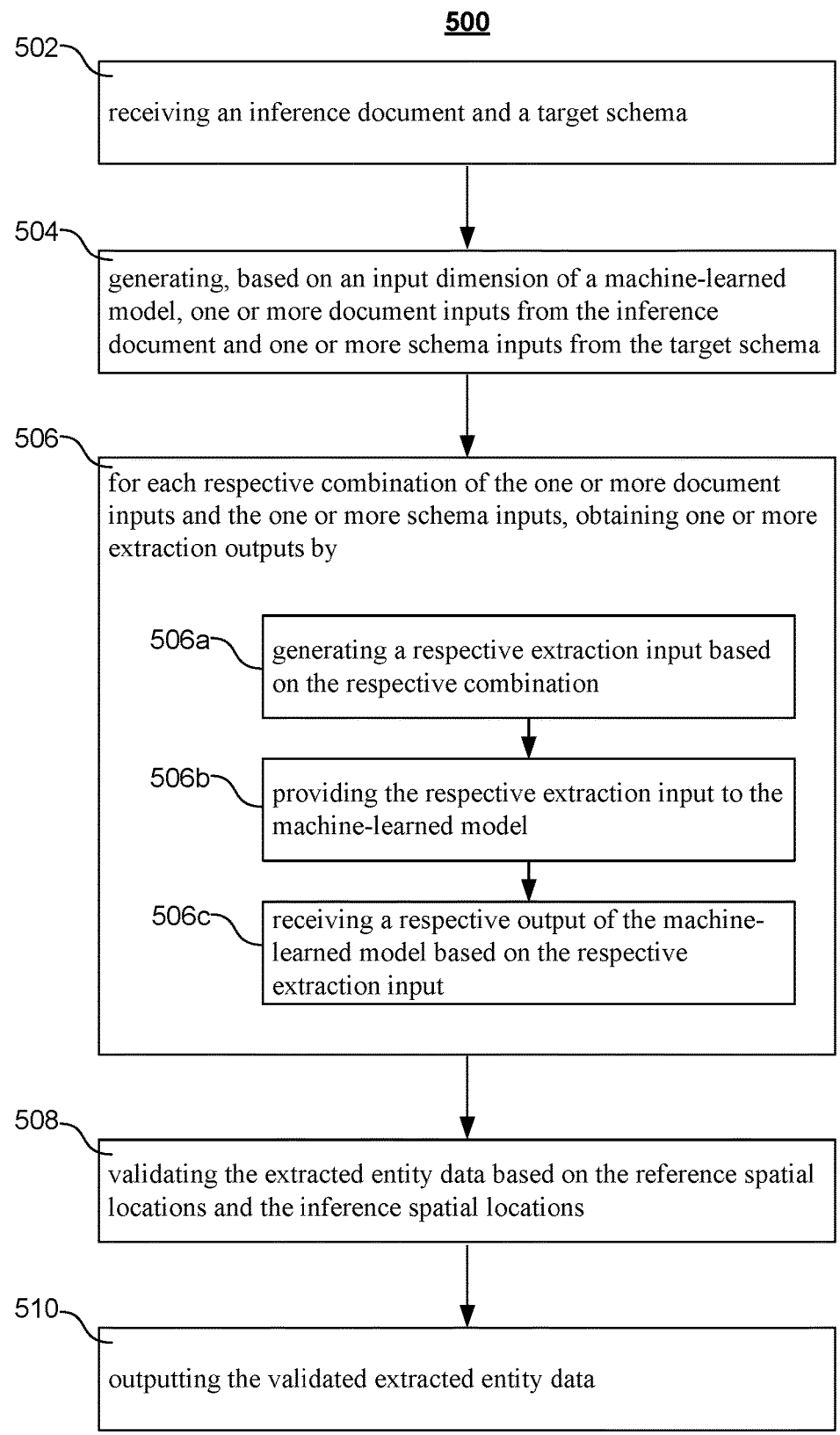
FIG. 5 depicts a flow chart diagram of an example method to perform document entity extraction according to example embodiments of the present disclosure.

FIG. 5 depicts a flow chart diagram of an example method 500 to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system receives an inference document and a target schema. As described above in reference to FIGS. 1 and 2, the inference document includes document data and reference spatial locations for document data, and the target schema defines data entities to be extracted from the document data. In some embodiments, the inference document is based on an output of an optical character recognition system, and the document data of the inference document includes data representing optically-recognized characters in the rendering of the inference document.

In some embodiments the computing system can also receive an image input and can use the image input to validate the output of the optical character recognition system.

In some embodiments, the inference document can be an image representation of an electronic document.

In some embodiments, the one or more reference location tags respectively indicating one or more reference spatial locations of the document data within the rendering of the inference document and can be indicative of one or more bounding boxes containing a portion of the document data.

At 504, the computing system generates one or more document inputs and one or more schema inputs. As described above in reference to FIG. 2, in one embodiment, the one or more document inputs and one or more schema inputs can be generated using chunking to separate the inference document into pages or other subportions and separate the target schema into high-level data entities and subentities.

In some embodiments, the computing system can subdivide the target schema into a plurality of independent branches, where each branch of the plurality of independent branches representing a data entity and subentities of the data entity. Each independent branch of the plurality of independent branches can then be used as a schema input of the target schema.

At 506, for each respective combination of the one or more document inputs and the one or more schema inputs, the computing system obtains an extraction input for a language processing model based on a combination of a document input and a schema input.

At 506a, the computing system generates a respective extraction input based on the respective combination of the document input and the schema input.

In some embodiments, the prompt for the respective extraction input can include one or more extraction instructions. The one or more extraction instructions can include a description of a spatial location.

In some embodiments, generating the respective extraction input can include retrieving at least one document from a document corpus and adding at least a portion of the at least one document to the prompt for at least one document input and schema input combination.

In some embodiments, the prompt can include an extraction representation of one or more data entities extracted from the portion of the at least one document.

At 506b, the computing system provides the extract input to the language processing model for completion of the extraction input. The language processing model analyzes the document input based on the extraction instructions and the schema input.

At 506c, the computing system receives a data output from the language processing model. In some embodiments, the data output includes entity data extracted according to the target schema and one or more inference location tags corresponding to one or more inference spatial locations of the entity data within the rendering of the inference document.

At 508, the computing system validates the extracted entity data using, for example, decoding, grounding, and confidence scores as described above with reference to FIG. 2-4. In some embodiments, validating the extracted entity data based on the reference spatial locations and the inference spatial locations comprises can include performing normalized string matching between the extracted entity data and document data at the reference spatial locations in the rendering of the inference document as indicated by the one or more inference location tags corresponding to one or more inference spatial locations of the entity data within the rendering of the inference document. Validating the data can also include determine if the extracted entity data matches the document data. In response to determining that the extracted entity data matches the document data, the computing system can validate the extracted entity data.

In some embodiments, the computing system can, in response to determining that the extracted entity data does not match the document data, discard the extracted entity data.

In some embodiments, the computing system can send the extraction input to the model for a plurality of iterations to obtain a plurality of outputs and, based on the plurality of outputs, the computing system can determine a representative value.

In some embodiments, determining the representative value can include determining a majority output from the plurality of outputs.

In some embodiments, a confidence score can be generated based on the majority output and the plurality of outputs.

In some embodiments, the representative value can be determined based at least in part on one or more received scores from the model.

At 510, the computing system outputs validated extracted entity data for use by other computer software applications.

Example Devices and Systems

Figure 6A:
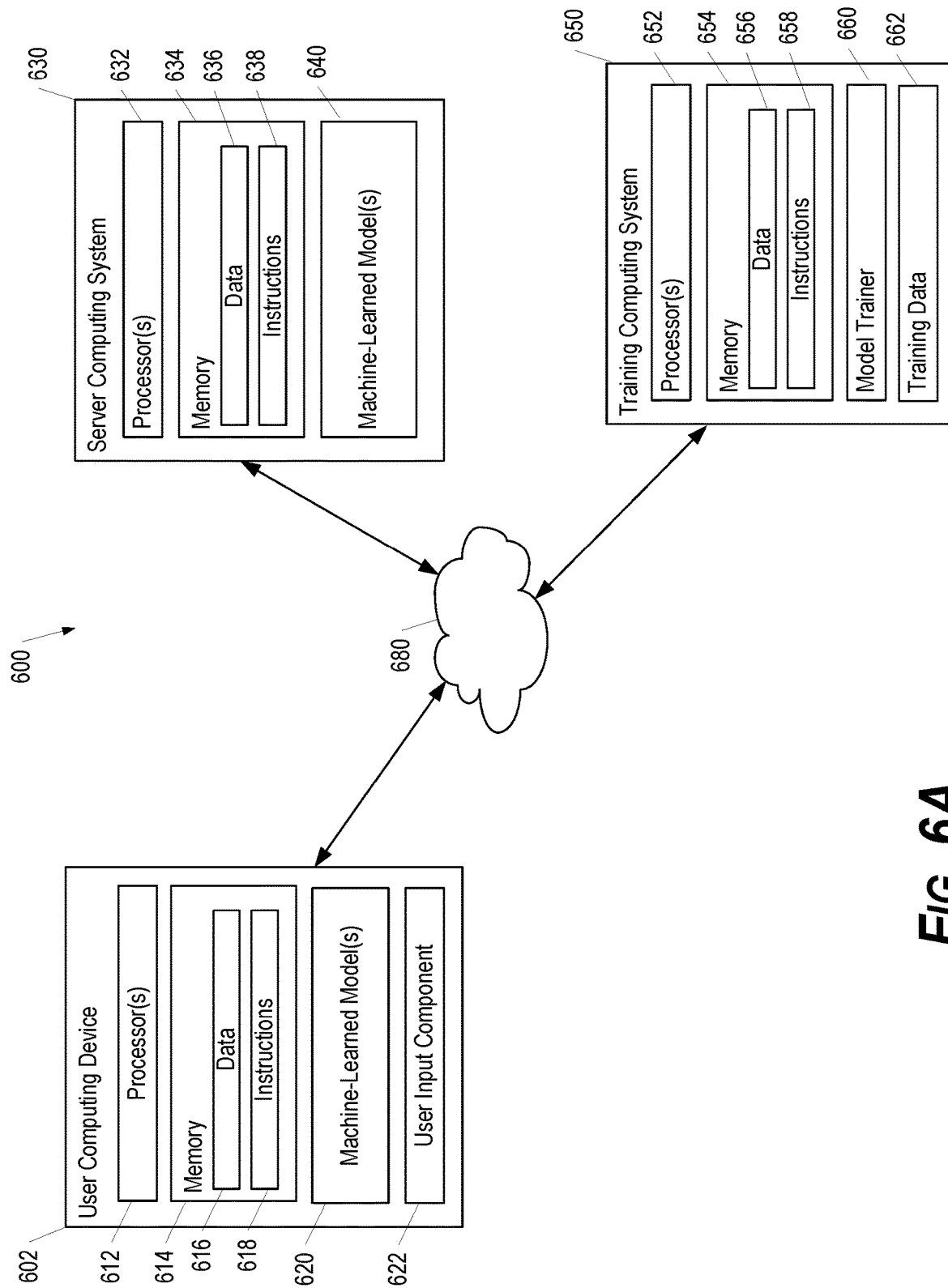
FIG. 6A depicts a block diagram of an example computing system that performs document entity extraction according to example embodiments of the present disclosure.
Figure 6B:
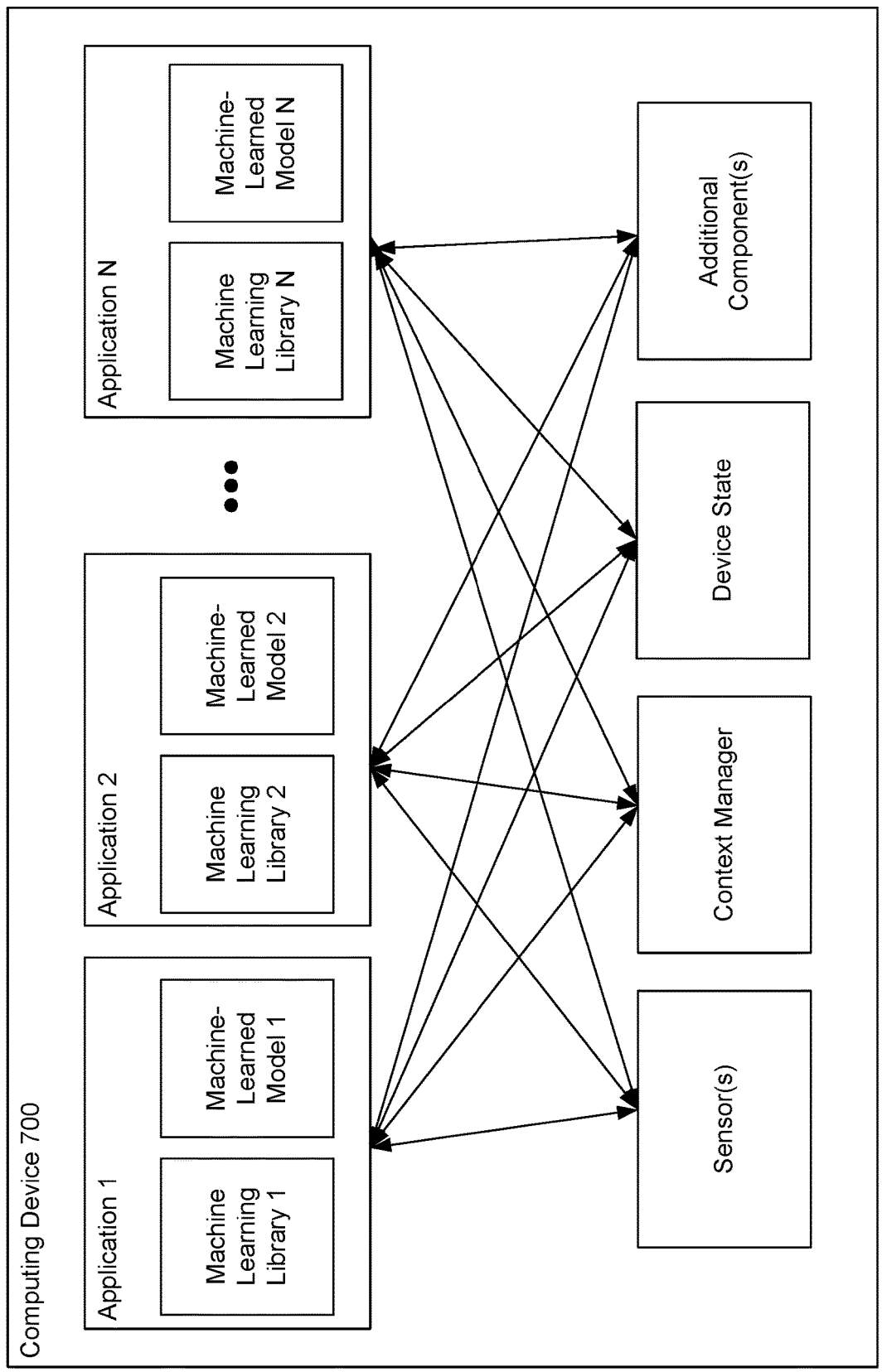
FIG. 6B depicts a block diagram of an example computing device that performs document entity extraction according to example embodiments of the present disclosure.
Figure 6C:
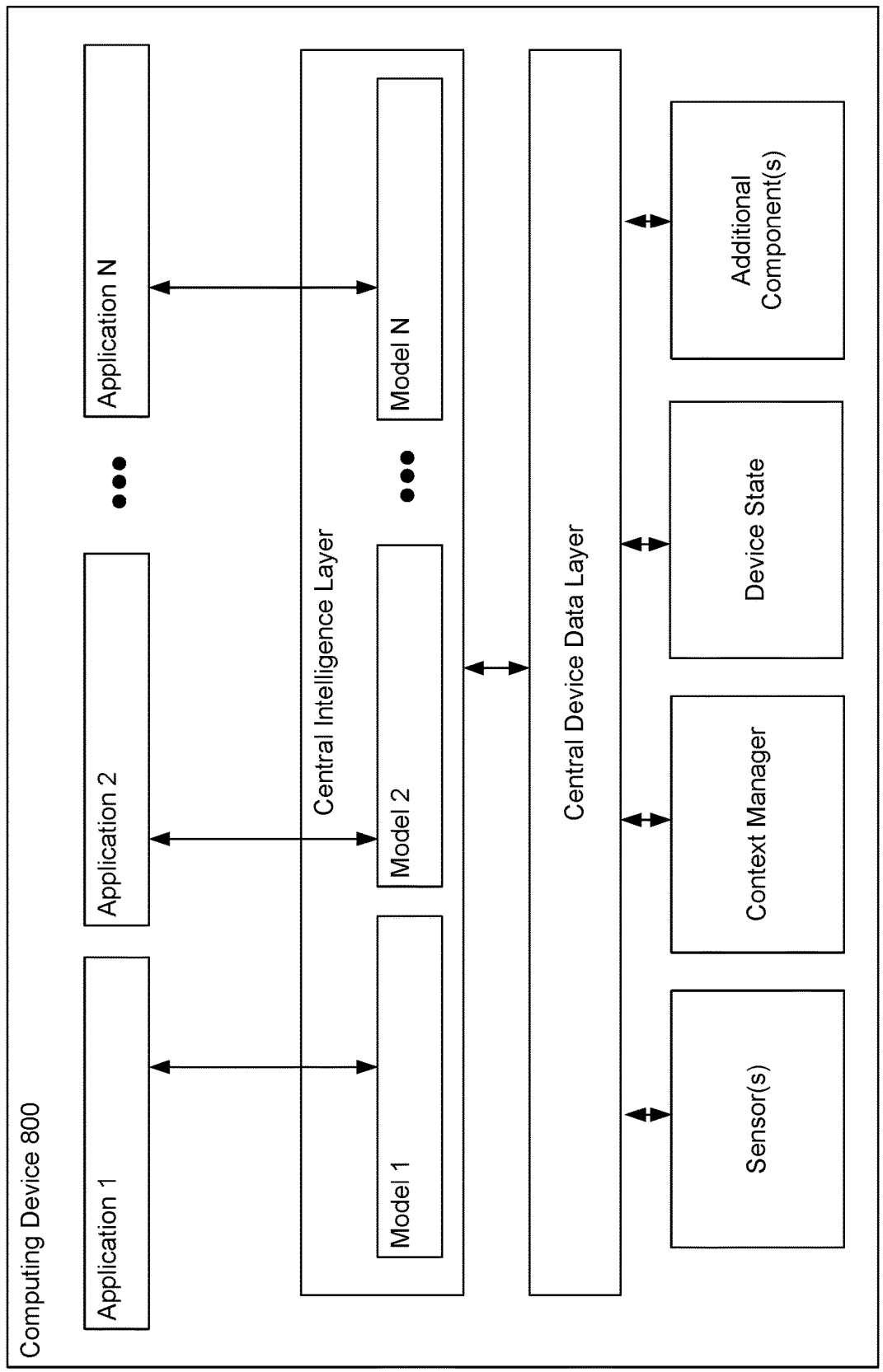
FIG. 6C depicts a block diagram of an example computing device that performs document entity extraction according to example embodiments of the present disclosure.

FIG. 6A depicts a block diagram of an example computing system 600 that performs document entity extraction according to example embodiments of the present disclosure. The system 600 includes a user computing device 602, a server computing system 630, and a training computing system 650 that are communicatively coupled over a network 680.

The user computing device 602 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 602 includes one or more processors 612 and a memory 614. The one or more processors 612 can be any suitable processing device (e.g., a processor core, a microprocessor, an ASIC, an FPGA, a controller, a microcontroller, etc.) and can be one processor or a plurality of processors that are operatively connected. The memory 614 can include one or more non-transitory computer-readable storage media, such as RAM, ROM, EEPROM, EPROM, flash memory devices, magnetic disks, etc., and combinations thereof. The memory 614 can store data 616 and instructions 618 which are executed by the processor 612 to cause the user computing device 602 to perform operations.

In some implementations, the user computing device 602 can store or include one or more machine-learned models 620 (e.g., machine learned model 125, 225, 325, etc.). For example, the machine-learned models 620 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 620 are discussed with reference to FIGS. 1 to 5.

In some implementations, the one or more machine-learned models 620 can be received from the server computing system 630 over network 680, stored in the user computing device memory 614, and then used or otherwise implemented by the one or more processors 612. In some implementations, the user computing device 602 can implement multiple parallel instances of a single machine-learned model 620 (e.g., to perform parallel language processing).

More particularly, the one or more machine-learned models 620 can process text data using component machine-learned models, such as neural networks.

Additionally or alternatively, one or more machine-learned models 640 can be included in or otherwise stored and implemented by the server computing system 630 that communicates with the user computing device 602 according to a client-server relationship. For example, the machine-learned models 640 can be implemented by the server computing system 640 as a portion of a web service (e.g., a language processing service). Thus, one or more models 620 can be stored and implemented at the user computing device 602 and/or one or more models 640 can be stored and implemented at the server computing system 630.

The user computing device 602 can also include one or more user input components 622 that receives user input. For example, the user input component 622 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 630 includes one or more processors 632 and a memory 634. The one or more processors 632 can be any suitable processing device (e.g., a processor core, a microprocessor, an ASIC, an FPGA, a controller, a microcontroller, etc.) and can be one processor or a plurality of processors that are operatively connected. The memory 634 can include one or more non-transitory computer-readable storage media, such as RAM, ROM, EEPROM, EPROM, flash memory devices, magnetic disks, etc., and combinations thereof. The memory 634 can store data 636 and instructions 638 which are executed by the processor 632 to cause the server computing system 630 to perform operations.

In some implementations, the server computing system 630 includes or is otherwise implemented by one or more server computing devices. In instances in which the server computing system 630 includes plural server computing devices, such server computing devices can operate according to sequential computing architectures, parallel computing architectures, or some combination thereof.

As described above, the server computing system 630 can store or otherwise include one or more machine-learned models 640. For example, the models 640 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 540 are discussed with reference to FIGS. 1 to 5.

The user computing device 602 and/or the server computing system 630 can train the models 620 and/or 640 via interaction with the training computing system 650 that is communicatively coupled over the network 680. The training computing system 650 can be separate from the server computing system 630 or can be a portion of the server computing system 530.

The training computing system 650 includes one or more processors 652 and a memory 654. The one or more processors 652 can be any suitable processing device (e.g., a processor core, a microprocessor, an ASIC, an FPGA, a controller, a microcontroller, etc.) and can be one processor or a plurality of processors that are operatively connected. The memory 654 can include one or more non-transitory computer-readable storage media, such as RAM, ROM, EEPROM, EPROM, flash memory devices, magnetic disks, etc., and combinations thereof. The memory 654 can store data 656 and instructions 658 which are executed by the processor 652 to cause the training computing system 650 to perform operations. In some implementations, the training computing system 650 includes or is otherwise implemented by one or more server computing devices.

The training computing system 650 can include a model trainer 660 that trains the machine-learned models 620 and/or 640 stored at the user computing device 602 and/or the server computing system 630 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 660 can perform a number of generalization techniques (e.g., weight decays, dropouts, etc.) to improve the generalization capability of the models being trained.

In particular, the model trainer 660 can train the machine-learned models 620 and/or 640 based on a set of training data 662. The training data 662 can include, for example, text data and data from other input modes to learn the statistical relationships between words, phrases, and sentences, which allows the machine-learned models 620 and/or 640 generate coherent and contextually relevant responses when given a prompt or a query.

In some implementations, if the user has provided consent, the training examples can be provided by the user computing device 602. Thus, in such implementations, the model 620 provided to the user computing device 602 can be trained by the training computing system 650 on user-specific data received from the user computing device 602. In some instances, this process can be referred to as personalizing the model.

The model trainer 660 includes computer logic utilized to provide desired functionality. The model trainer 660 can be implemented in hardware, firmware, and/or software controlling a general purpose processor. For example, in some implementations, the model trainer 660 includes program files stored on a storage device, loaded into a memory and executed by one or more processors. In other implementations, the model trainer 660 includes one or more sets of computer-executable instructions that are stored in a tangible computer-readable storage medium such as RAM, hard disk, or optical or magnetic media.

The network 680 can be any type of communications network, such as a local area network (e.g., intranet), wide area network (e.g., Internet), or some combination thereof and can include any number of wired or wireless links. In general, communication over the network 680 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 5A illustrates one example computing system that can be used to implement the present disclosure. Other computing systems can be used as well. For example, in some implementations, the user computing device 602 can include the model trainer 660 and the training dataset 662. In such implementations, the models 620 can be both trained and used locally at the user computing device 602. In some of such implementations, the user computing device 602 can implement the model trainer 660 to personalize the models 620 based on user-specific data.

In some embodiments, the user computing device 602 can operate in a cloud computing environment, where the models 620 and/or 640 are contained wholly or partially on one or more remote computing devices in the cloud computing environment. The user computing device 602 can communicate data to the one or more remote computing devices, such as communicating input data for the models 620 and/or 640 to the one or more remote computing devices, and can receive from the one or more remote computing devices output data, such as output from the models 620 and/or 640.

In some embodiments, the models 620 and/or 640 can be contained on one or more remote computing systems, and user computing device 602 can utilize an application programming interface ("API") to access the models 620 and/or 640. For example, the user computing device 602 can provide input data to the one or more remote computing systems using a call to the API with the input data as part of the call to the API. The API receives the call and passes the input data to the models 620 and/or 640 and then provides back to the user computing device 602 output data from the models 620 and/or 640.

FIG. 5B depicts a block diagram of an example computing device 700 that performs according to example embodiments of the present disclosure. The computing device 700 can be a user computing device or a server computing device.

The computing device 700 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

FIG. 5C depicts a block diagram of an example computing device 800 that performs according to example embodiments of the present disclosure. The computing device 700 can be a user computing device or a server computing device.

The computing device 800 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 800.

The central intelligence layer can communicate with a central device data layer. The central device data layer can be a centralized repository of data for the computing device 700. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for performing document entity extraction, the method comprising:
   receiving, by a computing system comprising a processor, an inference document and a target schema, wherein the inference document comprises document data and one or more reference location tags respectively indicating one or more reference spatial locations of the document data within a rendering of the inference document;
   generating, by the computing system and based on an input dimension of a machine-learned model, one or more document inputs from the inference document and one or more schema inputs from the target schema;
   for each respective combination of the one or more document inputs and the one or more schema inputs, obtaining one or more extraction outputs by:
      generating, by the computing system, a respective prompt including one or more reference spatial locations based on the respective combination;
      providing, by the computing system, the respective prompt to the machine-learned model; and
      receiving, by the computing system, a respective output of the machine-learned model based on the respective prompt, wherein the respective output comprises entity data extracted according to the target schema and one or more inference location tags corresponding to one or more inference spatial locations of the entity data within the rendering of the inference document;
   validating, by the computing system, the extracted entity data based on the reference spatial locations and the inference spatial locations; and
   outputting, by the computing system, the validated extracted entity data.

2. The computer-implemented method of claim 1, wherein the inference document is based on an output of an optical character recognition system, and wherein the document data includes data representing optically-recognized characters in the rendering of the inference document.

3. The computer-implemented method of claim 2, the method comprising:
   receiving, by the computing system, an image input, wherein the image input is used to validate the output of the optical character recognition system.

4. The computer-implemented method of claim 1, wherein the inference document is an image representation of an electronic document.

5. The computer-implemented method of claim 1, wherein the one or more reference location tags respectively indicating one or more reference spatial locations of the document data within the rendering of the inference document are indicative of one or more bounding boxes containing a portion of the document data.

6. The computer-implemented method of claim 1, wherein validating the extracted entity data based on the reference spatial locations and the inference spatial locations comprises:
   performing, by the computing system, normalized string matching between the extracted entity data and document data at the reference spatial locations in the rendering of the inference document as indicated by the one or more inference location tags corresponding to one or more inference spatial locations of the entity data within the rendering of the inference document;
   determining, by the computing system, if the extracted entity data matches the document data; and in response to determining that the extracted entity data matches the document data, validating, by the computing system, the extracted entity data.

7. The computer-implemented method of claim 6, the method comprising:
in response to determining that the extracted entity data does not match the document data:
discarding, by the computing system, the extracted entity data.

8. The computer-implemented method of claim 1, the method comprising:
dividing, by the computing system, the target schema into a plurality of independent branches, each branch of the plurality of independent branches representing a data entity and subentities of the data entity, wherein each independent branch of the plurality of independent branches is a schema input of the target schema.

9. The computer-implemented method of claim 1, wherein the prompt for the respective extraction input includes one or more extraction instructions.

10. The computer-implemented method of claim 9, wherein the one or more extraction instructions include a description of a spatial location.

11. The computer-implemented method of claim 1, the method comprising:
retrieving, by the computing system, at least one document from a document corpus; and
adding, by the computing system, at least a portion of the at least one document to the prompt for at least one document input and schema input combination.

12. The computer-implemented method of claim 11, wherein the prompt includes an extraction representation of one or more data entities extracted from the portion of the at least one document.

13. The computer-implemented method of claim 12, wherein determining the representative value comprises determining a majority output from the plurality of outputs.

14. The computer-implemented method of claim 13, wherein a confidence score is generated based on the majority output and the plurality of outputs.

15. The computer-implemented method of claim 12, wherein the representative value is determined based at least in part on one or more received scores from the model.

16. A computing system for performing document entity extraction, the computing system comprising:
one or more processors; and
a non-transitory, computer-readable medium comprising instructions that, when executed by the one or more processors, cause the one or more processors to perform operations, the operations comprising:
receiving an inference document and a target schema, wherein the inference document comprises document data and one or more reference location tags respectively indicating one or more reference spatial locations of the document data within a rendering of the inference document;
generating, based on an input dimension of a machine-learned model, one or more document inputs from the inference document and one or more schema inputs from the target schema;
for each respective combination of the one or more document inputs and the one or more schema inputs, obtaining one or more extraction outputs by:
generating a respective prompt including one or more reference spatial locations based on the respective combination;
providing the respective prompt to the machine-learned model; and
receiving a respective output of the machine-learned model based on the respective prompt, wherein the respective output comprises entity data extracted according to the target schema and one or more inference location tags corresponding to one or more inference spatial locations of the entity data within the rendering of the inference document;
validating the extracted entity data based on the reference spatial locations and the inference spatial locations; and
outputting the validated extracted entity data.

17. The computing system of claim 16, wherein validating the extracted entity data based on the reference spatial locations and the inference spatial locations comprises:
performing normalized string matching between the extracted entity data and document data at the reference spatial locations in the rendering of the inference document as indicated by the one or more inference location tags corresponding to one or more inference spatial locations of the entity data within the rendering of the inference document;
determining if the extracted entity data matches the document data; and
in response to determining that the extracted entity data matches the document data, validating the extracted entity data.

18. The computing system of claim 17, the operations comprising:
in response to determining that the extracted entity data does not match the document data:
discarding the extracted entity data.

19. The computing system of claim 16, the operations comprising:
sending the extraction input to the model for a plurality of iterations to obtain a plurality of outputs; and
determining a representative value based on the plurality of outputs.

20. A non-transitory, computer-readable medium comprising instructions that, when executed by one or more processors, cause the one or more processors to perform operations, the operations comprising:
receiving an inference document and a target schema, wherein the inference document comprises document data and one or more reference location tags respectively indicating one or more reference spatial locations of the document data within a rendering of the inference document;
generating, based on an input dimension of a machine-learned model, one or more document inputs from the inference document and one or more schema inputs from the target schema;
for each respective combination of the one or more document inputs and the one or more schema inputs, obtaining one or more extraction outputs by:
generating a respective prompt including one or more reference spatial locations based on the respective combination;
providing the respective prompt to the machine-learned model; and
receiving a respective output of the machine-learned model based on the respective prompt, wherein the respective output comprises entity data extracted according to the target schema and one or more inference location tags corresponding to one or more inference spatial locations of the entity data within the rendering of the inference document;

validating the extracted entity data based on the reference spatial locations and the inference spatial locations; and outputting the validated extracted entity data.

* * * * *